(12) United States Patent
Reynolds et al.

(10) Patent No.: US 8,464,431 B2
(45) Date of Patent: Jun. 18, 2013

(54) STRING HEAD FOR A TRIMMER

(75) Inventors: Marion W. Reynolds, Anderson, SC (US); Todd Rickey, Anderson, SC (US); John W. Wiggins, Williamston, SC (US); John Morris, Anderson, SC (US)

(73) Assignee: Techtronic Outdoor Products Technology Limited, Hamilton (BM)

( * ) Notice: Subject to any disclaimer, the term of this patent is extended or adjusted under 35 U.S.C. 154(b) by 728 days.

(21) Appl. No.: 12/691,811

(22) Filed: Jan. 22, 2010

(65) Prior Publication Data

US 2010/0180451 A1  Jul. 22, 2010

Related U.S. Application Data

(60) Provisional application No. 61/146,464, filed on Jan. 22, 2009.

(51) Int. Cl.
*B26B 7/00* (2006.01)

(52) U.S. Cl.
USPC .............................. 30/276; 30/347

(58) Field of Classification Search
USPC ................ 30/176, 276, 347; 29/759; 56/12.7
See application file for complete search history.

(56) References Cited

U.S. PATENT DOCUMENTS

| 4,035,912 | A | 7/1977  | Ballas et al. |
| 4,052,789 | A | 10/1977 | Ballas, Sr.   |
| 4,062,115 | A | 12/1977 | Lee           |
| 4,067,108 | A | 1/1978  | Ballas        |
| 4,068,376 | A | 1/1978  | Briar         |
| 4,097,991 | A | 7/1978  | Proulx        |
| 4,104,796 | A | 8/1978  | Sheldon       |
| 4,104,797 | A | 8/1978  | Ballas        |
| 4,136,446 | A | 1/1979  | Tripp         |
| 4,145,809 | A | 3/1979  | Proulx        |
| 4,151,646 | A | 5/1979  | Lane          |
| 4,162,575 | A | 7/1979  | Ballas        |
| 4,167,812 | A | 9/1979  | Moore         |

(Continued)

FOREIGN PATENT DOCUMENTS

| EP | 0313679 | 5/1989 |
| EP | 0784919 | 7/1997 |

(Continued)

OTHER PUBLICATIONS

EP10250114 European Search Report and Written Opinion, dated May 11, 2010, (9 pages).

(Continued)

*Primary Examiner* — Andrea Wellington
*Assistant Examiner* — Lisandra Rodriguez
(74) *Attorney, Agent, or Firm* — Michael Best & Friedrich LLP

(57) ABSTRACT

A trimmer head configured for operating in a fixed line configuration and a bump-feed configuration. The trimmer head includes a base including a cup having a top wall and a substantially cylindrical side wall defining an aperture. The base also includes a collar extending axially from the top wall of the cup for coupling the trimmer head with the output shaft. A fixed line head is at least partially received within the cup when the trimmer head is in the fixed line configuration and a bump-feed spool is at least partially received within the cup of the base when the trimmer head is in the bump-feed configuration.

13 Claims, 16 Drawing Sheets

U.S. PATENT DOCUMENTS

| | | | | |
|---|---|---|---|---|
| 4,189,905 | A | 2/1980 | Frantello | |
| 4,195,408 | A | 4/1980 | Palmieri et al. | |
| 4,203,212 | A | 5/1980 | Proulx | |
| 4,205,439 | A | 6/1980 | Sweet | |
| 4,211,005 | A | 7/1980 | Woods | |
| 4,229,882 | A | 10/1980 | Chartier | |
| 4,242,797 | A | 1/1981 | Palmieri et al. | |
| 4,254,550 | A | 3/1981 | Satoh | |
| 4,301,642 | A | 11/1981 | Thurber | |
| 4,335,510 | A | 6/1982 | Close et al. | |
| 4,347,666 | A | 9/1982 | Moore | |
| 4,366,621 | A | 1/1983 | Mitchell | |
| 4,411,069 | A | 10/1983 | Close et al. | |
| 4,419,822 | A | 12/1983 | Harris | |
| 4,476,632 | A | 10/1984 | Proulx | |
| 4,483,069 | A | 11/1984 | Moore | |
| 4,490,910 | A * | 1/1985 | Mattson et al. | 30/276 |
| 4,524,515 | A | 6/1985 | Oberg | |
| 4,571,831 | A | 2/1986 | White, III | |
| 4,607,431 | A | 8/1986 | Gay | |
| 4,630,371 | A | 12/1986 | Graham | |
| 4,656,739 | A | 4/1987 | Pittinger, Jr. | |
| 4,672,798 | A | 6/1987 | Ota | |
| 4,685,279 | A | 8/1987 | Gullett | |
| 4,756,146 | A | 7/1988 | Rouse | |
| 4,790,071 | A * | 12/1988 | Helmig et al. | 30/276 |
| 4,817,288 | A | 4/1989 | Hirose et al. | |
| 4,827,702 | A | 5/1989 | Cerreta | |
| 4,835,867 | A | 6/1989 | Collins et al. | |
| 4,852,258 | A | 8/1989 | Foster | |
| 4,866,846 | A | 9/1989 | Hoffmann et al. | |
| 4,882,843 | A | 11/1989 | Baba | |
| 4,897,923 | A * | 2/1990 | Collins | 30/276 |
| 4,959,904 | A | 10/1990 | Proulx | |
| 4,989,321 | A | 2/1991 | Hoffmann | |
| 5,020,223 | A | 6/1991 | Desent et al. | |
| 5,023,998 | A * | 6/1991 | Masciarella et al. | 30/276 |
| 5,063,673 | A | 11/1991 | Webster | |
| 5,109,607 | A | 5/1992 | Everts | |
| 5,174,027 | A | 12/1992 | Gusthalin | |
| 5,239,811 | A | 8/1993 | Spearman | |
| 5,276,968 | A | 1/1994 | Collins et al. | |
| 5,303,476 | A | 4/1994 | Tuggle | |
| 5,313,770 | A | 5/1994 | Smothers | |
| 5,339,526 | A * | 8/1994 | Everts | 30/276 |
| 5,359,777 | A | 11/1994 | Bauer et al. | |
| 5,365,724 | A | 11/1994 | Wagner | |
| 5,430,943 | A | 7/1995 | Lee | |
| 5,490,641 | A | 2/1996 | Worthing | |
| 5,649,413 | A | 7/1997 | Oostendorp | |
| 5,657,542 | A | 8/1997 | White, III et al. | |
| 5,659,960 | A | 8/1997 | Everts et al. | |
| 5,659,964 | A | 8/1997 | Lawrence | |
| 5,671,536 | A | 9/1997 | Everts et al. | |
| 5,675,897 | A | 10/1997 | Berfield | |
| 5,749,148 | A | 5/1998 | White, III et al. | |
| 5,758,424 | A | 6/1998 | Iacona et al. | |
| 5,765,287 | A | 6/1998 | Griffini et al. | |
| 5,806,192 | A | 9/1998 | Everts et al. | |
| 5,836,227 | A | 11/1998 | Dees, Jr. et al. | |
| 5,852,876 | A | 12/1998 | Wang | |
| 5,862,598 | A | 1/1999 | Lee | |
| 5,887,348 | A | 3/1999 | Iacona et al. | |
| 5,896,666 | A | 4/1999 | Iacona et al. | |
| 5,906,051 | A | 5/1999 | Nannen | |
| 5,916,111 | A | 6/1999 | Colens | |
| 5,979,064 | A | 11/1999 | Kitz et al. | |
| 6,035,618 | A | 3/2000 | Fogle | |
| 6,052,907 | A | 4/2000 | Wang | |
| 6,094,823 | A | 8/2000 | Brown et al. | |
| 6,094,825 | A | 8/2000 | Hinson | |
| 6,108,914 | A * | 8/2000 | Sheldon | 30/276 |
| 6,148,523 | A * | 11/2000 | Everts et al. | 30/276 |
| 6,263,580 | B1 | 7/2001 | Stark et al. | |
| 6,279,235 | B1 | 8/2001 | White, III et al. | |
| 6,293,350 | B1 | 9/2001 | Paolo | |
| 6,347,455 | B2 | 2/2002 | Brant et al. | |
| 6,363,616 | B1 * | 4/2002 | Kreissle | 30/347 |
| 6,385,853 | B1 | 5/2002 | Berfield | |
| 6,401,344 | B1 | 6/2002 | Moore et al. | |
| 6,427,341 | B1 | 8/2002 | Lee | |
| 6,442,845 | B2 | 9/2002 | Wheeler et al. | |
| 6,460,253 | B1 | 10/2002 | Wheeler et al. | |
| 6,519,857 | B1 * | 2/2003 | Proulx et al. | 30/276 |
| 6,581,292 | B2 | 6/2003 | Allis | |
| 6,594,907 | B2 | 7/2003 | Wilson et al. | |
| 6,722,040 | B2 | 4/2004 | Sullivan | |
| 6,854,185 | B1 | 2/2005 | Alliss | |
| 6,860,019 | B2 | 3/2005 | Hoche | |
| 6,901,667 | B2 | 6/2005 | Proulx | |
| 6,912,789 | B2 * | 7/2005 | Price, III | 30/276 |
| 6,928,741 | B2 | 8/2005 | Proulx et al. | |
| 6,944,954 | B1 | 9/2005 | Arnetoli | |
| 6,944,956 | B1 | 9/2005 | Fogle | |
| 6,952,877 | B2 | 10/2005 | Pfaltzgraff | |
| 7,017,272 | B2 * | 3/2006 | Grace | 30/275.4 |
| 7,111,403 | B2 | 9/2006 | Moore | |
| 7,219,488 | B2 | 5/2007 | Hatfield | |
| 7,257,898 | B2 | 8/2007 | Iacona | |
| 7,275,324 | B2 | 10/2007 | Proulx | |
| 7,412,768 | B2 | 8/2008 | Alliss | |
| 7,513,046 | B2 | 4/2009 | Proulx | |
| 7,587,828 | B2 | 9/2009 | Legrand | |
| 7,607,232 | B2 | 10/2009 | Pfaltzgraff | |
| 8,001,694 | B2 * | 8/2011 | Sing et al. | 30/276 |
| 8,025,249 | B2 * | 9/2011 | Alliss et al. | 242/388.1 |
| 8,176,639 | B2 * | 5/2012 | Doane et al. | 30/276 |
| 2002/0189107 | A1 | 12/2002 | Arnetoli | |
| 2003/0140503 | A1 | 7/2003 | Jerez | |
| 2003/0188437 | A1 | 10/2003 | Alliss | |
| 2004/0237315 | A1 | 12/2004 | Alliss | |
| 2005/0241157 | A1 | 11/2005 | Fogle | |
| 2006/0026846 | A1 | 2/2006 | Alliss | |
| 2006/0048395 | A1 | 3/2006 | Legrand | |
| 2006/0053635 | A1 | 3/2006 | Legrand | |
| 2006/0090350 | A1 | 5/2006 | Legrand | |
| 2006/0242842 | A1 | 11/2006 | Legrand | |
| 2006/0254061 | A1 | 11/2006 | Alliss | |
| 2008/0010836 | A1 | 1/2008 | Iacona | |
| 2008/0083120 | A1 * | 4/2008 | Alliss | 30/276 |
| 2008/0120847 | A1 | 5/2008 | Alliss | |
| 2008/0271424 | A1 * | 11/2008 | Alliss | 56/12.7 |
| 2009/0100686 | A1 | 4/2009 | Sing et al. | |
| 2009/0172955 | A1 * | 7/2009 | Morris et al. | 30/276 |
| 2010/0122516 | A1 * | 5/2010 | Nolin et al. | 56/12.7 |
| 2011/0232106 | A1 * | 9/2011 | Andrews et al. | 30/276 |

FOREIGN PATENT DOCUMENTS

| | | |
|---|---|---|
| EP | 0937380 | 8/1999 |
| EP | 1056327 | 12/2000 |
| EP | 1364571 | 11/2003 |
| EP | 1479277 | 11/2004 |
| EP | 1541004 | 6/2005 |
| WO | 98/18312 | 5/1998 |
| WO | 99/41966 | 8/1999 |
| WO | 03/015497 | 2/2003 |

OTHER PUBLICATIONS

Grass Gator, Grass Gator Frequently Asked Questions, Available online at: <http://www.cmdproducts.com/Grass%20Gator%20FAQs.html>, at least as early as Dec. 27, 2007.

Operator's Manual, Expand-it Straight Shaft Trimmer Attachment UT15522F. Techtronic Industries North America, Inc. Mar. 16, 2006.

Operator's Manual Ryobi 30cc String Trimers and Brushcutter RY30000 Series and Repair Sheet. Ryobi Technolgies Inc. Jan. 2004.

Operator's Manual Ryobi 30cc String Trimmer Electric Start RY29550. Techtronic Industries North America, Inc. Jun. 25, 2008.

Replacement Parts List, Aug. 14, 2008.

* cited by examiner

STRING HEAD FOR A TRIMMER

CROSS-REFERENCE TO RELATED APPLICATION

This application claims the benefit of and priority to U.S. Provisional Patent Application No. 61/146,464 filed Jan. 22, 2009, the entire contents of which are hereby incorporated by reference

FIELD OF THE INVENTION

The present invention relates to landscape trimmers, and more particularly, to string heads for landscape trimmers.

BACKGROUND OF THE INVENTION

Landscape trimmers are used to cut grass and weeds, and are often used to edge around trees, near fences and walls, and along landscape borders. Conventional landscape trimmers include an elongated shaft with a rotating element or gear head near the end of the elongated shaft, and a spool or string head is attached to the gear head. Typically, the string head includes a monofilament line (i.e., trimmer line) or other cutting device that is rotated by the gear head for cutting and trimming along landscaped areas, fences, and walls.

One type of string head is a bump-feed string head, which includes two relatively long lengths of trimmer line that are wrapped around a spool. A user bumps the string head on the ground when the exposed trimmer line becomes too short or worn in order to feed additional trimmer line out of the string head. Another type of string head is a fixed line string head. For a fixed line string head, the user feeds, typically two, discrete lengths of trimmer line (generally around 12 to 18 inches) through the string head. The trimmer lines are each held adjacent one end by the string head and the opposite ends of the trimmer lines are exposed for cutting. When the trimmer line becomes too short or wears, the user feeds a new piece of trimmer line through the string head.

SUMMARY

In one construction, the invention provides a landscape trimmer including a motor, an output shaft driven by the motor, and a trimmer head coupled to the output shaft and rotatable with the output shaft. The trimmer head is operable in a fixed line configuration and a bump-feed configuration. The trimmer head includes, a base including a cup having a top wall and a substantially cylindrical side wall that defines an aperture, and the base including a collar extending axially from the top wall of the cup and for coupling the trimmer head with the output shaft. A fixed line head is at least partially received within the cup of the base when the trimmer head is in the fixed line configuration. The fixed line head includes at least one channel having an inlet portion substantially aligned with the aperture of the base, an outlet portion, and a clamping member. A bump-feed spool is at least partially received within the cup of the base when the trimmer head is in the bump-feed configuration. The bump-feed spool includes a body and a trimmer line wrapped around the body, the trimmer line extending through the aperture in the side wall of the base when the bump-feed spool is received by the base.

In another construction, the invention provides a trimmer head for use on a landscape trimmer having an output shaft. The trimmer head includes a base having a cup with a top wall and a substantially cylindrical side wall that defines an aperture, where the top wall and the side wall define an inner cavity of the base, and the base includes a collar extending from the top wall of the cup and away from the inner cavity. The collar for coupling with the output shaft of the landscape trimmer for rotation therewith. The trimmer head also includes a fixed line head received within the inner cavity of the base and coaxial with the output shaft, the fixed line assembly including a base member and a cover removably coupled to the base member, the base member and the cover defining a channel including an inlet portion substantially aligned with the aperture of the base, an outlet portion, and a clamp member configured to retain a portion of a trimmer line within the channel. The trimmer head also includes a bump-knob coupled to a free end of the output shaft to retain the fixed line head within the base.

In yet another construction, the invention provides a fixed line head for use in a trimmer head. The trimmer head includes a base having a cup with a top wall and a substantially cylindrical side wall defining an aperture, the top wall and the side wall defining an inner cavity, and the base also including a plurality of stops positioned within the cavity and extending radially inwardly from the side wall. The fixed line head includes a base member, a first channel at least partially defined by the base member, the first channel including a first inlet portion, a first outlet portion, and at least one clamp member able to retain at least a portion of a trimmer line within the first channel. The fixed line head also includes a second channel at least partially defined by the base, the second channel including a second inlet portion, a second outlet portion, and at least one clamp member able to retain at least a portion of a trimmer line within the second channel. The fixed line head also includes a plurality of recesses defined by the base member and extending axially therethrough, the recesses receiving the stops when the fixed line head is received in the base to further align one of the first and the second inlet portions with the aperture defined by the side wall.

In a further construction, the invention provides a method of converting a trimmer head between a fixed line configuration and a bump-feed configuration. The trimmer head includes a base having a side wall defining a first aperture and an inner cavity, one of a spool and a fixed line head at least partially received within the cavity, and a bump-knob to retain the one of the spool and the fixed line head within the inner cavity. The method includes removing the bump-feed knob, removing the one of the spool and the fixed line head from the inner cavity, introducing the other of the spool and the fixed line head into the inner cavity, and introducing the bump-knob to retain the other of the spool and the fixed line head within the inner cavity.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting.

DETAILED DESCRIPTION

Figure 1:
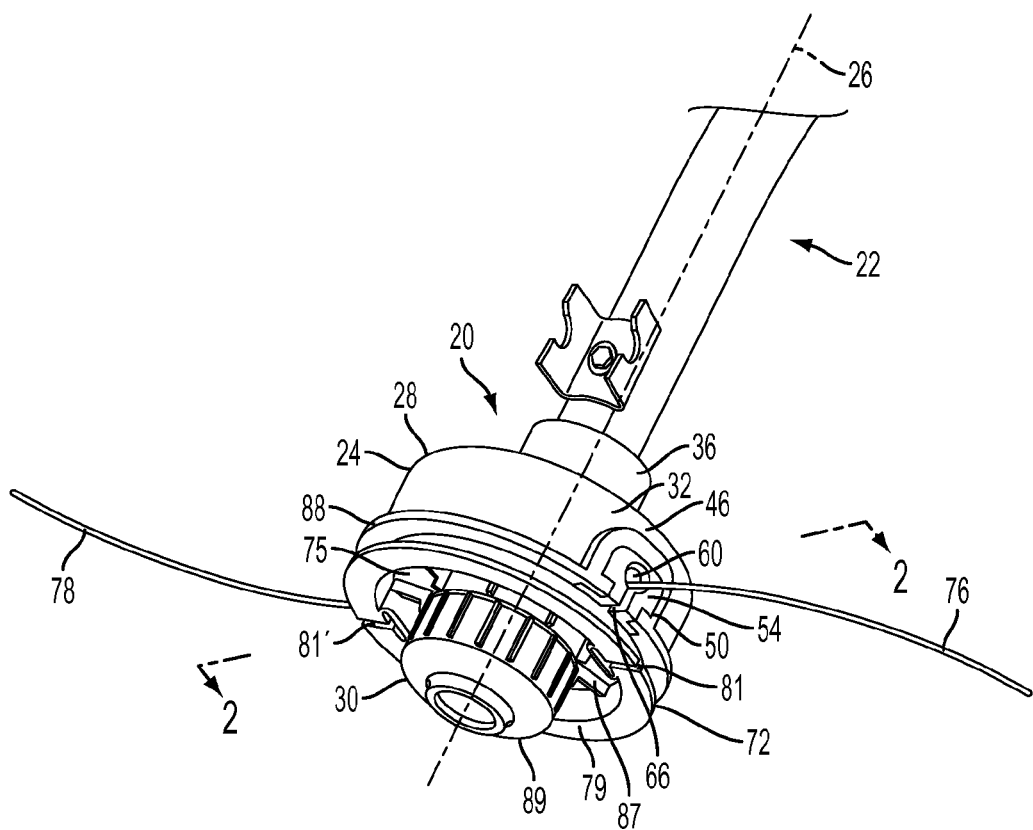
FIG. 1 is a perspective view of a string head trimmer according to one construction of the invention and in a bump-feed configuration coupled to an output shaft of a powered trimmer.
Figure 5:
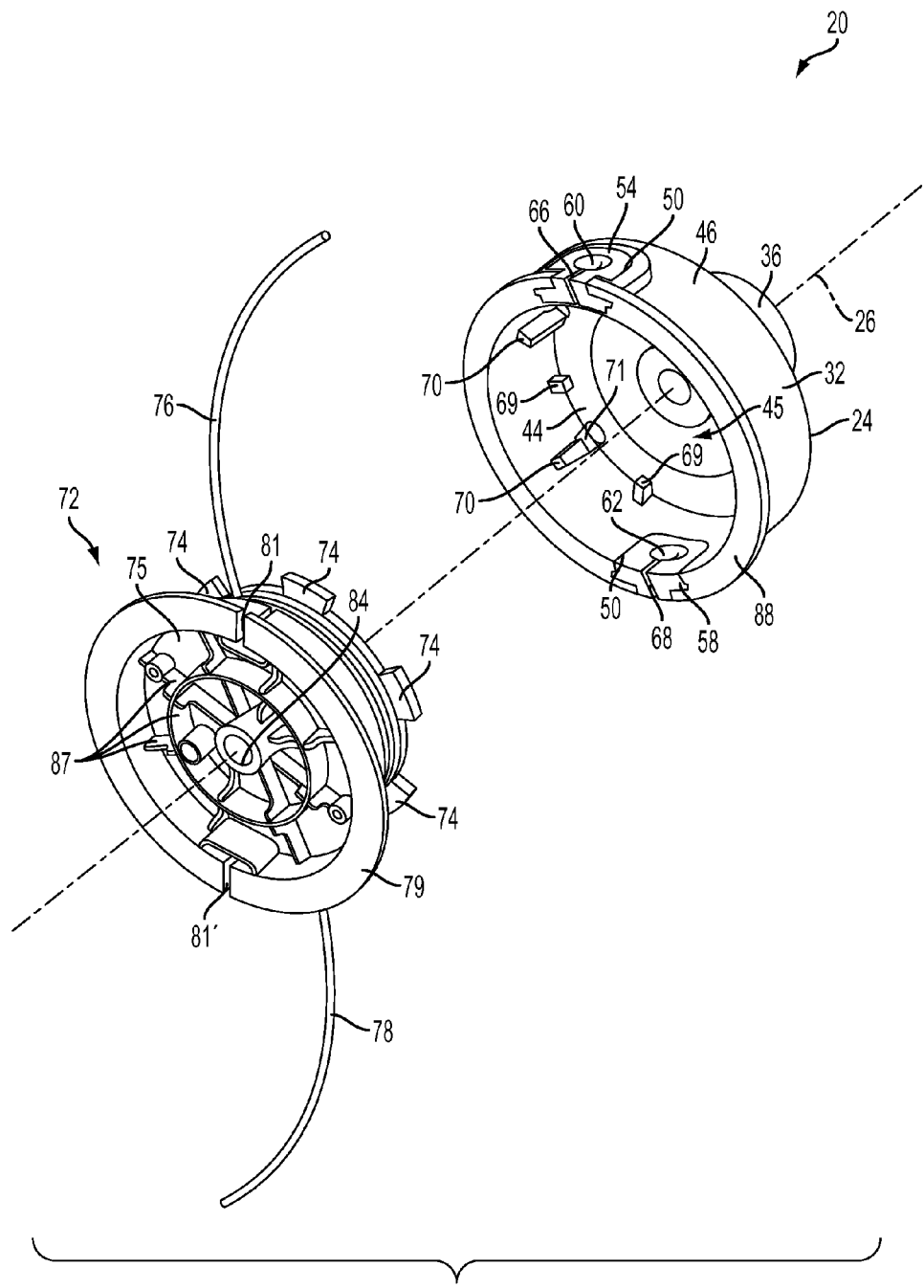
FIG. 5 is a perspective view of a portion of the string head trimmer of FIG. 1 with a bump-knob removed and the bump-feed spool exploded from a string head.
Figure 6:
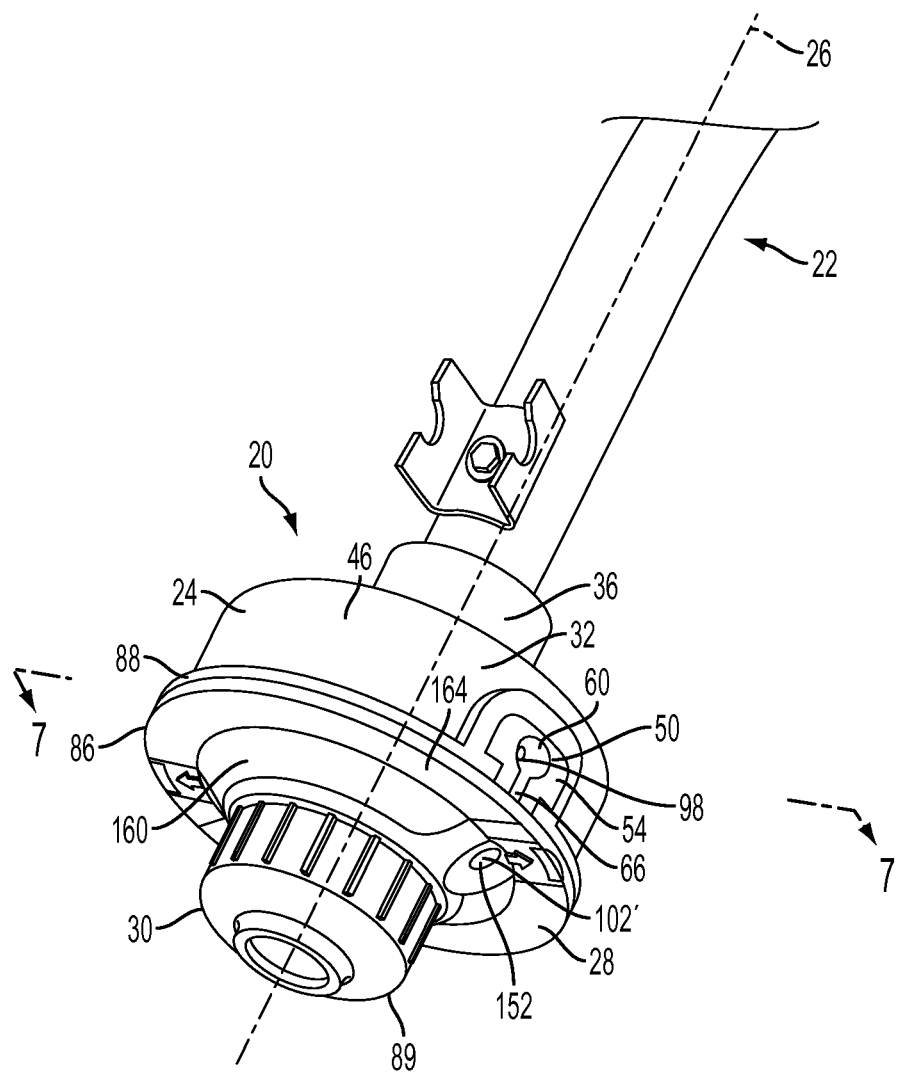
FIG. 6 is a perspective view of the string head trimmer in a fixed line configuration and coupled to the output shaft of a powered trimmer.

FIGS. 1 and 6 illustrate a trimmer head or string head 20 for use on a powered trimmer 22 that is used as either a bump-feed string head or a fixed line string head. The powered trimmer 22 includes an output shaft 23 (FIGS. 2 and 7) driven by a motor, such as a two-cycle gas engine, an electric motor, or the like. As illustrated in FIGS. 1-10, the string head 20 defines a central axis 26 and includes a base 24 couplable to and rotatable with the output shaft 23. The base 24 is able to receive any one of a bump-feed spool 72 and a fixed line head 86 (described below and shown in FIGS. 5 and 11, respectively). The string head 20 also includes a bump-knob 30 removably coupled to the output shaft 23 to retain any one of the bump-feed spool and the fixed line trimmer assembly within the base 24. In other constructions, the bump-knob 30 may be coupled directly to the base 24.

Figure 2:
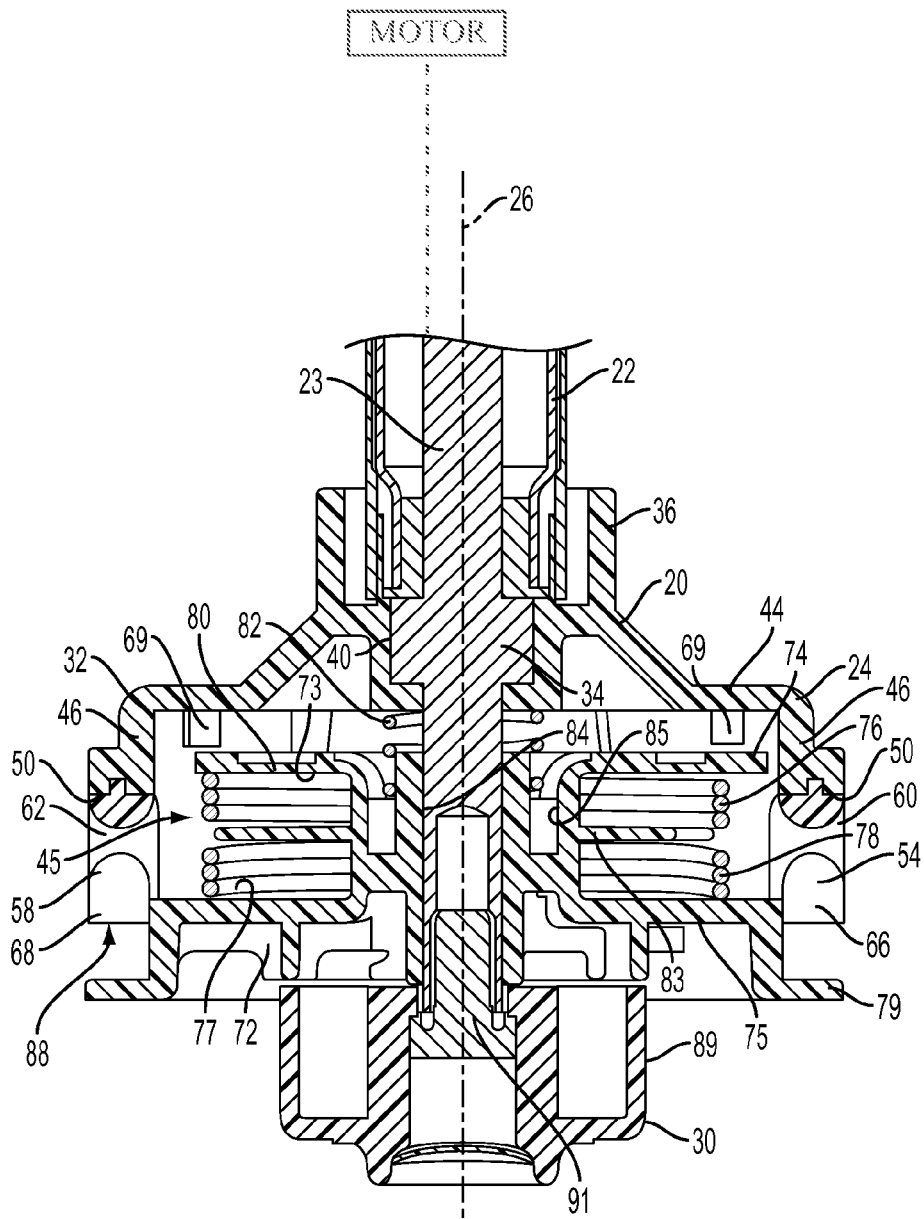
FIG. 2 is a section view of the string head trimmer taken along lines 2—2 of FIG. 1.
Figure 3:
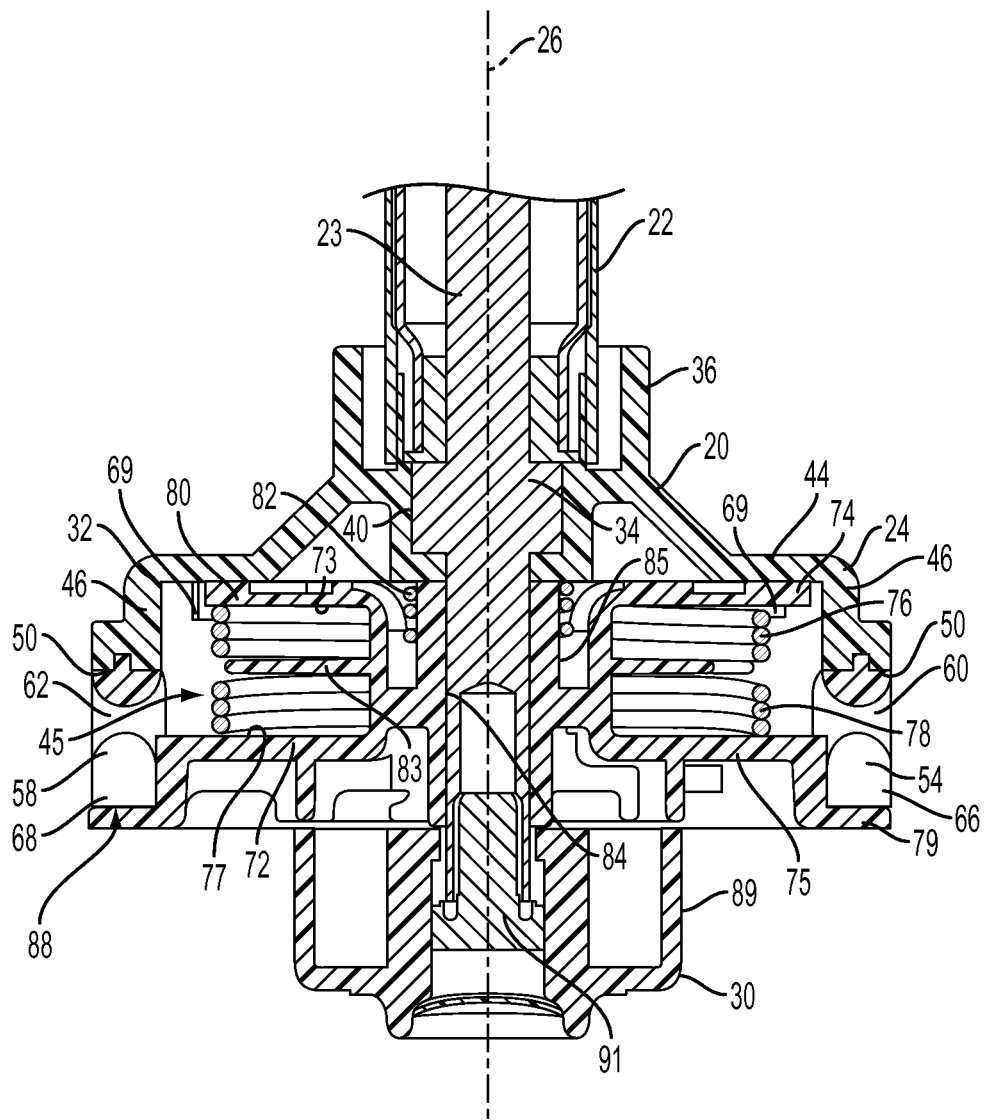
FIG. 3 depicts the string head trimmer of FIG. 2 with a spool in an alternate position.
Figure 4:
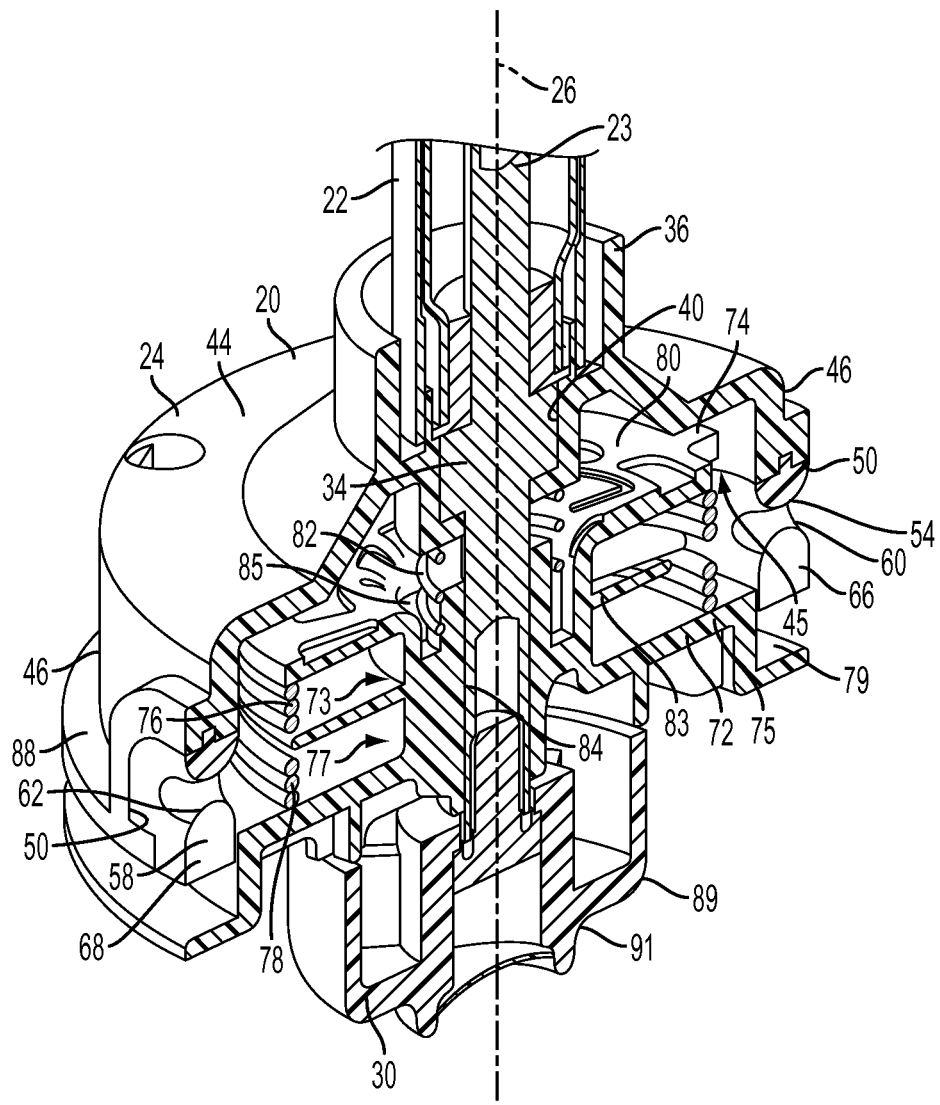
FIG. 4 is a perspective view of the string head trimmer of FIG. 2.

Referring to FIGS. 2-5, the base 24 includes a cup 32 and a collar 36 that extends from the cup 32. As best seen in FIGS. 2 and 4, the base 24 includes a hex shaped aperture 40 extending through the cup 32 substantially co-axial with the central axis 26. The aperture 40 is configured to receive a hexagonal connector portion 34 of the output shaft 23 and transmit torque from the output shaft 23 to the base 24. In a further construction, the aperture 40 and the connector portion 34 of the output shaft 23 have other shapes or connection features for interfacing with each other to transmit torque.

With continued reference to FIGS. 2-5, the cup 32 includes a top wall 44 and a cylindrical side wall 46 that extends axially downwardly from the top wall 44 to define an inner cavity 45. The collar 36 extends axially away from the top wall 44 in an opposite direction and away from the inner cavity 45. The side wall 46 defines a pair of opposed apertures 50, which are U-shaped in the illustrated construction. In the illustrated construction, inserts 54, 58 are positioned within one of the apertures 50. Each of the inserts 54, 58 includes a tapered aperture 60, 62 and a slot 66, 68, respectively.

Referring to FIGS. 2, 3, 5, and 10, the cup 32 includes a first set of stops 69 (only one of which is shown in FIG. 5) and a second set of stops 70 positioned within the inner cavity 45 extending radially inwardly from the side wall 46. In the illustrated construction, the stops 69 extend axially downward from the top wall 44, while the stops 70 are spaced a distance from the top wall 44 to form a gap 71 therebetween and extend axially beyond the stops 69 toward a bottom edge 88 of the base 24. In the illustrated construction, the stops 69, 70 are circumferentially spaced apart from adjacent stops 69, 70 at least a distance substantially corresponding to an arcuate width of tabs 74 of the spool 72, as described below. In the illustrated construction, the cup 32 includes six equally spaced stops 69 along the inner surface of the side wall 46. In addition, the cup 32 includes four stops 70 positioned between adjacent stops 69, with two stops 70 being omitted proximate the recesses 50. In further constructions, each set of stops 69, 70 may include more or less stops dependent upon the particular embodiment.

The string head 20 is configured for use in either a bump-feed configuration (for example, with a bump-feed spool 72) or a fixed line configuration (for example, with a fixed line head 86). Referring to FIGS. 1-5, when the string head 20 is used in the bump-feed configuration, the bump-feed spool 72 is positioned within the cup 32 of the base 24. While in the cup 32, the spool 72 is moveable between a first position, in which a top wall 80 of the spool 72 is spaced a first axial distance from the top wall 44 (FIG. 3), and a second position, in which the top wall 80 is spaced a second axial distance from the top wall 44 (FIG. 2). In the illustrated construction, the second axial distance is greater than the first axial distance. A spring 82 is seated about the output shaft 23 and between the spool 72 and the top wall 44 of the base 24 to bias the spool 72 to the second position.

The spool 72 includes a body 75 defining a first winding recess 73, about which a first string line 76 is wound, and a second winding recess 77, spaced a distance from the first winding recess 73 and separated by a radially extending wall 83, about which a second string line 78 is wound. The spool 72 also includes a plurality of tabs 74 (i.e., six in the illustrated construction) extending radially outwardly from the top wall 80 and spaced along a perimeter of the wall 80. The spool 72 includes a lower lip 79 extending radially outwardly from the body 75 of the spool 72, the lip 79 defining a set of slots 81, 81' (FIG. 5). The spool 72 also defines a central recess 84 configured to receive at least a portion of the output shaft 23. An annular groove 85, concentric with the central recess 84, provides a seat for the biasing spring 82. In the illustrated construction, when the string head 20 is assembled with the bump-feed spool 72, the lower lip 79 contacts the bottom edge 88 of the side wall 46 to limit the distance the spool 72 may be biased into the cavity 45. In the illustrated construction, the spool 72 includes a plurality of reinforcing ribs 87 to prevent flexing and warping of the body 75.

The slots 81, 81' of the spool 72 correspond to the first and second slots of the outer wall 66, 68, such that when the string head 20 is assembled with the spool 72 the slots 66, 68 are substantially aligned with the slots 81, 81'. In the illustrated construction, the slots 81, 81' are generally T-shaped so that the ends of the first and second trimmer lines 76, 78 may be secured within the slots 81, 81' when the spool 72 is removed from the cavity 45. Further, the slots 81, 81' prevent the first and second trimmer lines 76, 78 from un-coiling from the spool 72 during storage outside the base 24. When the spool 72 is positioned within the cup 32, the slots 81, 81' provide a continuous path, collectively with slots 66 and 68, which allows a user to manually move the ends of the first and second trimmer lines 76, 78 from a secured position within the slots 81, 81' to a working position within the tapered apertures 60, 62 without removing the spool 72 from the base 24.

To assemble the string head 20 for use in a bump-feed configuration, the spool 72 is loaded into the base 24 by axially introducing the spool 72 into the cavity 45. The spool 72 is rotated with respect to the cup 32 to align the slots 66, 68 of the cup with the slots 81, 81' of the spool 72. Once aligned, the user may manually maneuver the trimmer lines 76, 78 through the slots 81, 81' of the spool 72 and through the slots 66, 68 of the cup 32, and into the corresponding apertures 60, 62, respectively. Once the spool 72 is positioned within the cavity 45, the spool 72 is secured to the cup 32 by the bump-knob 30.

Referring to FIGS. 2-4, the bump-knob 30 includes a body 89 and a fastener 91 threadably received within the output shaft 23. The body 89 is axially moveable along the fastener 91 and contacts either the spool 72 or the fixed line head 86 (depending upon the current configuration). The fastener 91 limits the axial distance the body 89 may move away from the base 24, thereby maintaining any one of the spool 72 and the fixed line head 86 within the cavity 45. When the string head 20 is in the bump-feed configuration, the body 89 moves axially along the fastener 91 and contacts the spool 72 to move the spool 72 between the first and second positions.

During operation of the string head 20 in the bump-feed configuration, the spool 72 is biased into the second position by the spring 82. In the second position, the tabs 74 engage the stops 70 of the base 24 such that the spool 72 rotates with the base 24. In this mode, ends of the first and second trimmer lines 76, 78 extend from the apertures 60, 62 to cut vegetation.

To feed additional trimmer line from the string head 20, the head 20 is "bumped" or pressed against an external surface (e.g., the ground). During operation, the centrifugal force from the ends of the first and second trimmer lines 76, 78 create a moment about the spool 72 urging the spool 72 to rotate with respect to the base 24. The motion is restricted by the second set of stops 70 when the spool is in the first position. When the bump-knob 30 contacts the external surface (e.g., during a "bump"), the bump knob 30 moves axially upwardly along the fastener 91, thereby contacting and overcoming the bias of spring 82 to push the spool 72 towards the top wall 44 and into the first position (FIG. 3). In the first position, the tabs 74 no longer contact the second set of stops 70 and the spool 72 rotates with respect to the base 24. Therefore, the tabs 74 pass through the gaps 71 formed between the stops 70 and the wall 44 allowing more trimmer line 76, 78 to be fed from the spool 72 until the tabs 74 contact one of the stops 69 and rotation of the spool 72 is once again restricted. Once bump-knob 30 is no longer contacting the ground, the bump-knob returns to an initial position and the spool 72 is biased axially away from the wall 44 by the spring 82 and back into the second position. In the second position, the tabs 74 no longer contact the stops 69 and the spool 72 rotates past the stops 69 until the tabs 74 engage one of the stops 70. Generally, each bumping motion of the bump-knob 30 rotates the spool 72 a predetermined angular amount with respect to the base 24 to release a length of both the first trimmer line 76 and the second trimmer line 78 through the respective apertures 60, 62.

As discussed above, the string head 20 is also configured for use in a fixed line configuration (for example, with the fixed line head 86). Referring to FIGS. 6-16, when the string head 20 is used in the fixed line configuration, the fixed line head 86 is positioned within the cup 32 of the base 24. In use, a user can switch between the bump-feed configuration and the fixed line configuration by removing the spool 72 (FIG. 5) from the cavity 45 of the base 24 and inserting the fixed line head 86 (FIGS. 11-16) into the cavity 45.

Referring to FIGS. 10-16, the fixed line head 86 includes a base member 90 and a cover 28 coupled together to partially define a first line retainer 94 and a second line retainer 94'. The first and second line retainers 94, 94' are substantially the same; therefore, like components have been given like reference numbers with the exception of a prime symbol to designate the second line retainer 94' and its components (only the first line retainer 94 will be described in detail). While the illustrated fixed line head 86 includes the two line retainers 94, 94', in other constructions the fixed line head 86 may include one or more than two line retainers.

Figure 12:
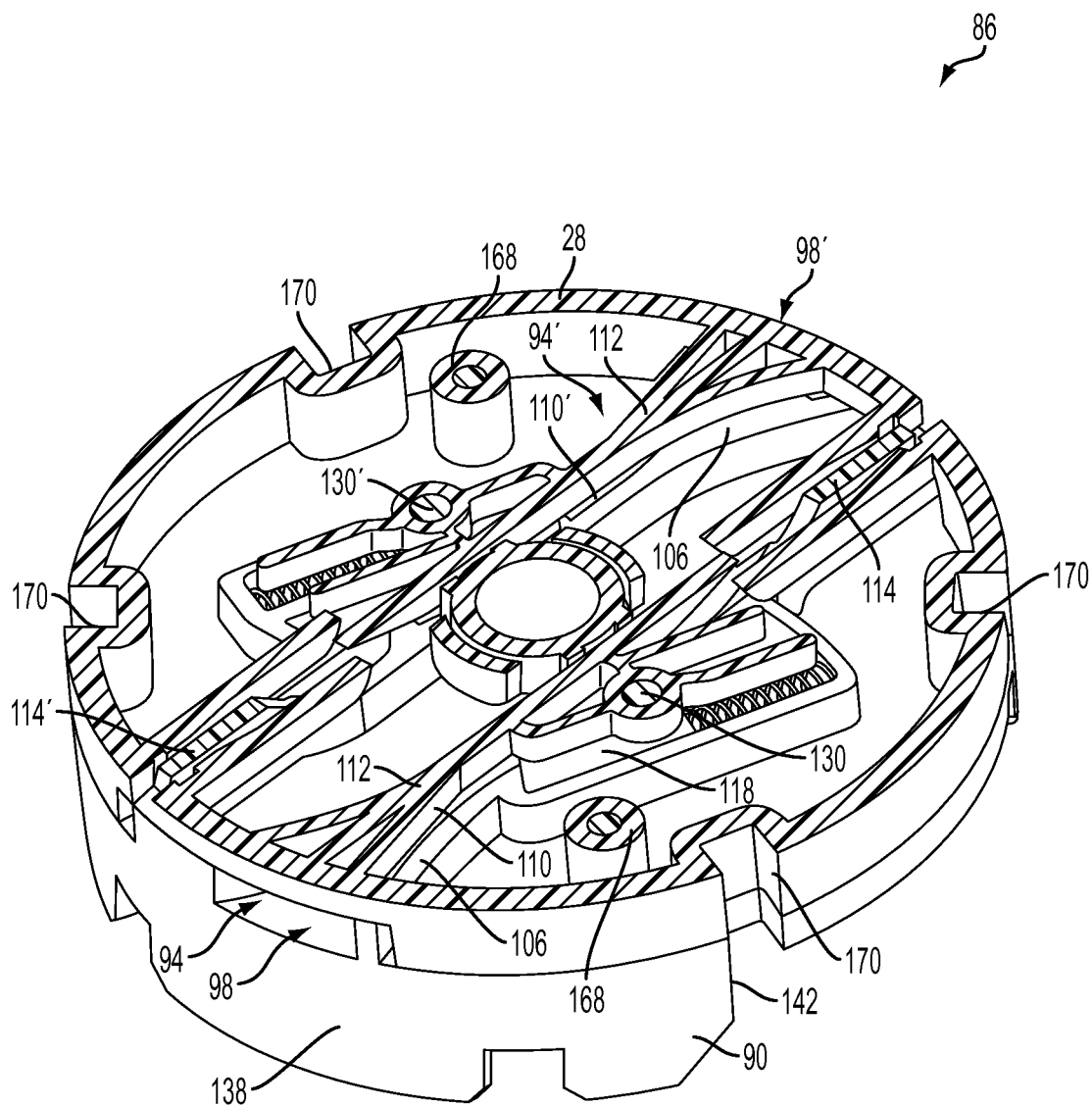
FIG. 12 is section view of the fixed line head taken along lines 12—12 of FIG. 11.
Figure 13:
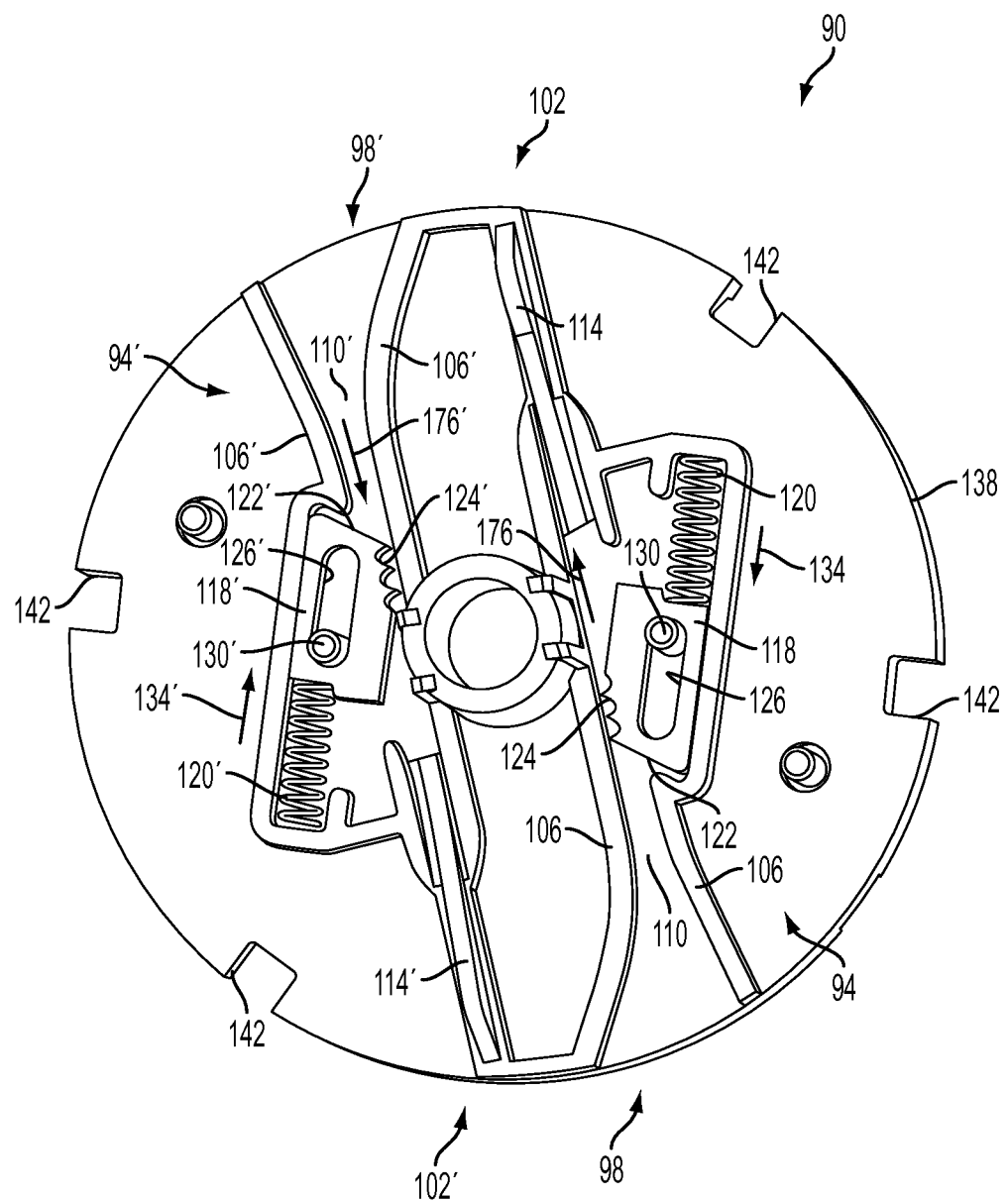
FIG. 13 is a top view of a base member of the fixed line head.

Referring to FIG. 13, the line retainer 94 includes an inlet end portion 98, an outlet end portion 102, a channel 110 extending between the end portions 98, 102, and a clamping member 118 for engaging the trimmer line (not shown). In the illustrated construction, the channel 110 of the line retainer 94 is at least partially defined by walls 106 that are integrally formed with the base member 90 and at least partially defined by ribs 112 formed in the cover 28, which are shown and described below with respect to FIG. 12. The walls 106 are spaced apart such that a distance between the walls 106 decreases from the inlet end portion 98 toward the outlet end portion 102. A ramp 114 is formed integrally with the base member 90 and positioned proximate the outlet end portion 102 to direct the trimmer line out a recess 156 formed in the cover 28.

Figure 14:
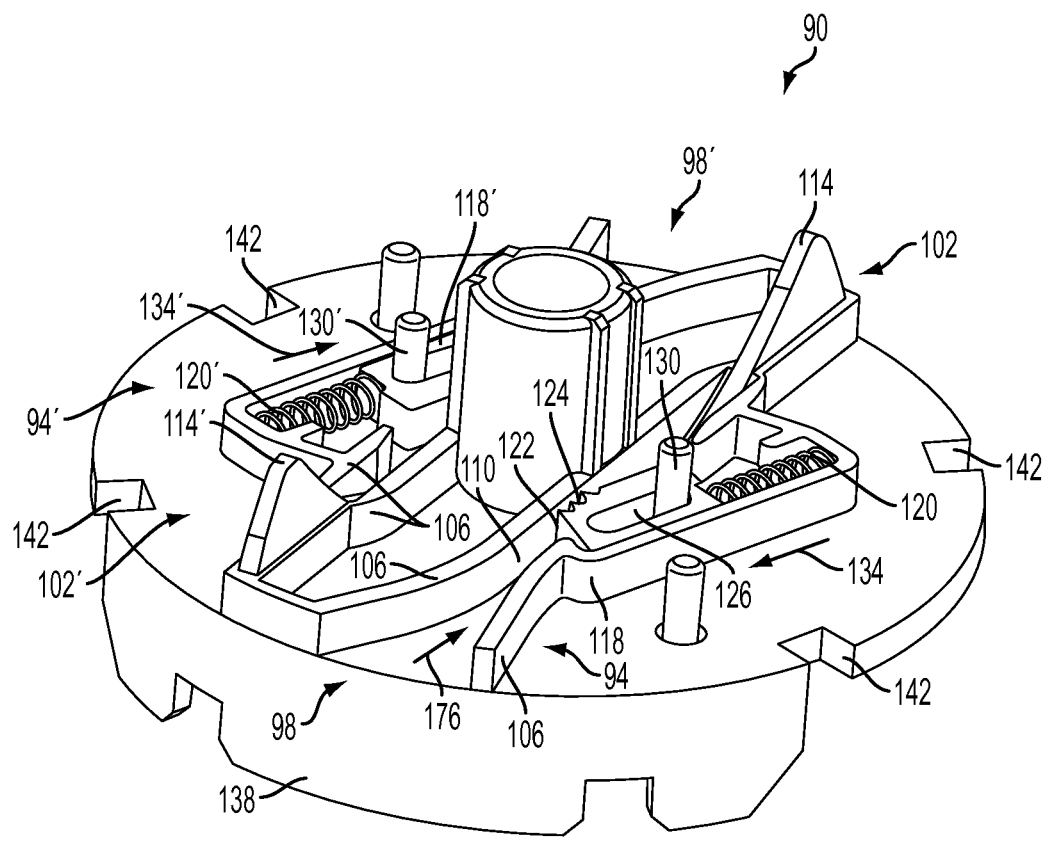
FIG. 14 is perspective view of the base member of the fixed line head.

Referring to FIGS. 13 and 14, the clamping member 118 of the line retainer 94 allows the trimmer line to travel in a single direction 176 and prevent removal of the trimmer line from the respective aperture 60, 62 of the string head 20. The clamping member 118 includes a biasing member 120, or spring, that biases the clamping member 118 towards the opposing wall 106, a ramped surface 122, teeth 124, and an elongated slot 126. A post 130 extending from the base member 90 is received by the slot 126 to guide and limit movement of the clamping member 118 with respect to the base member 90. Further, the configuration and spacing between the walls 106 also guide and limit movement of the clamping member 118. In the illustrated construction, the spring 120 is positioned between one of the walls 106 and the clamping member 118 to bias the clamping member 118 in the direction of arrow 134 towards the opposite wall 106 and into engagement with the trimmer line (not shown) placed in the line retainer 94. In the illustrated construction, when secured within the line retainer 94, the trimmer line is clamped between the gripping teeth 124 of the clamping member 118 and the wall 106. However in other constructions, the clamping member 118 may include a plurality of clamps retaining the trimmer line therebetween. In yet other constructions, the clamping member 118 may be pivotable in nature.

Figure 10:
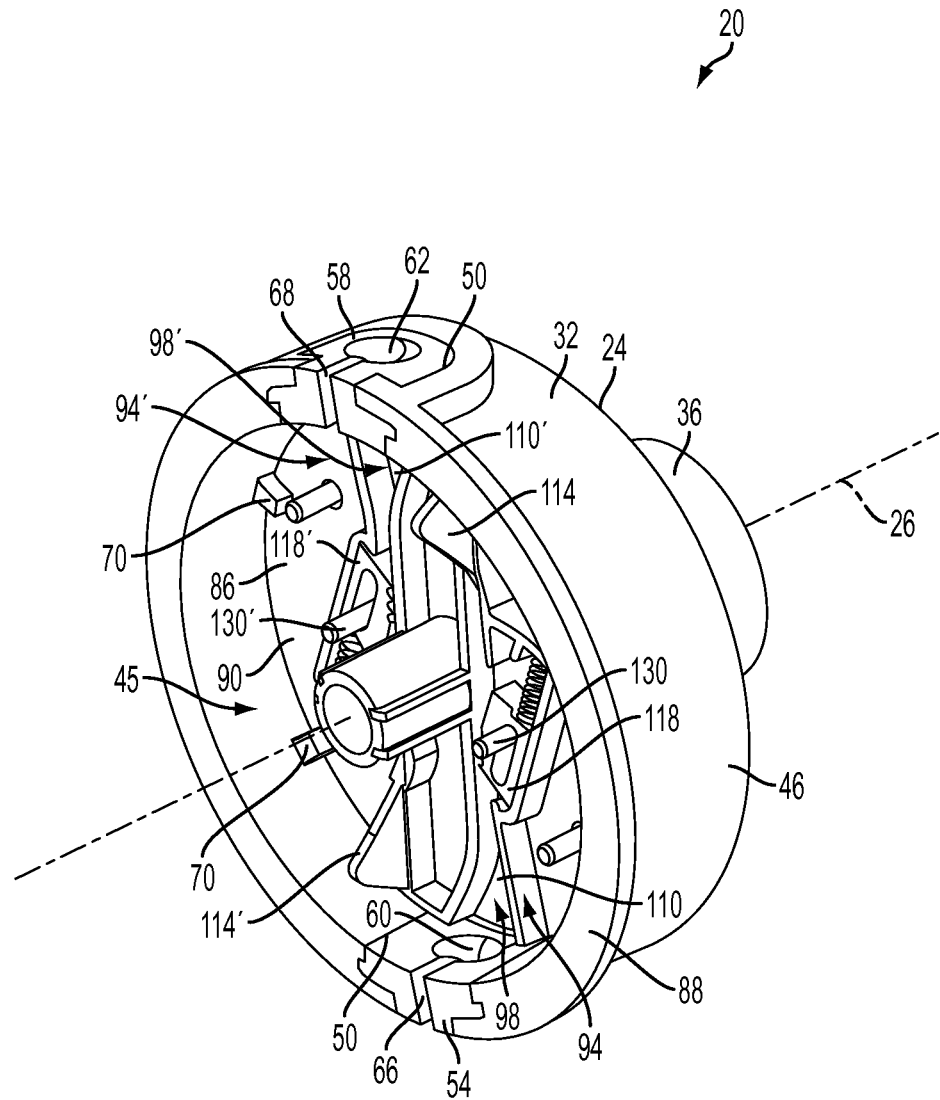
FIG. 10 is a perspective view of the string head with a cover removed for clarity.

The base member 90 of the fixed line head 86 has a generally cylindrical perimeter surface 138 and an outer diameter substantially corresponding to an inner diameter of the side wall 46 of the base 24. The base member 90 is shaped to be received within the cup 32 of the base 24, as illustrated in FIG. 10. Recesses 142 are formed in the outer surface 138 of the base member 90, and each recess 142 corresponds to and is configured to receive one of the stops 69, 70 of the string head base 24 such that the base member 90 of the fixed line head 86 rotates with the string head 20.

Figure 7:
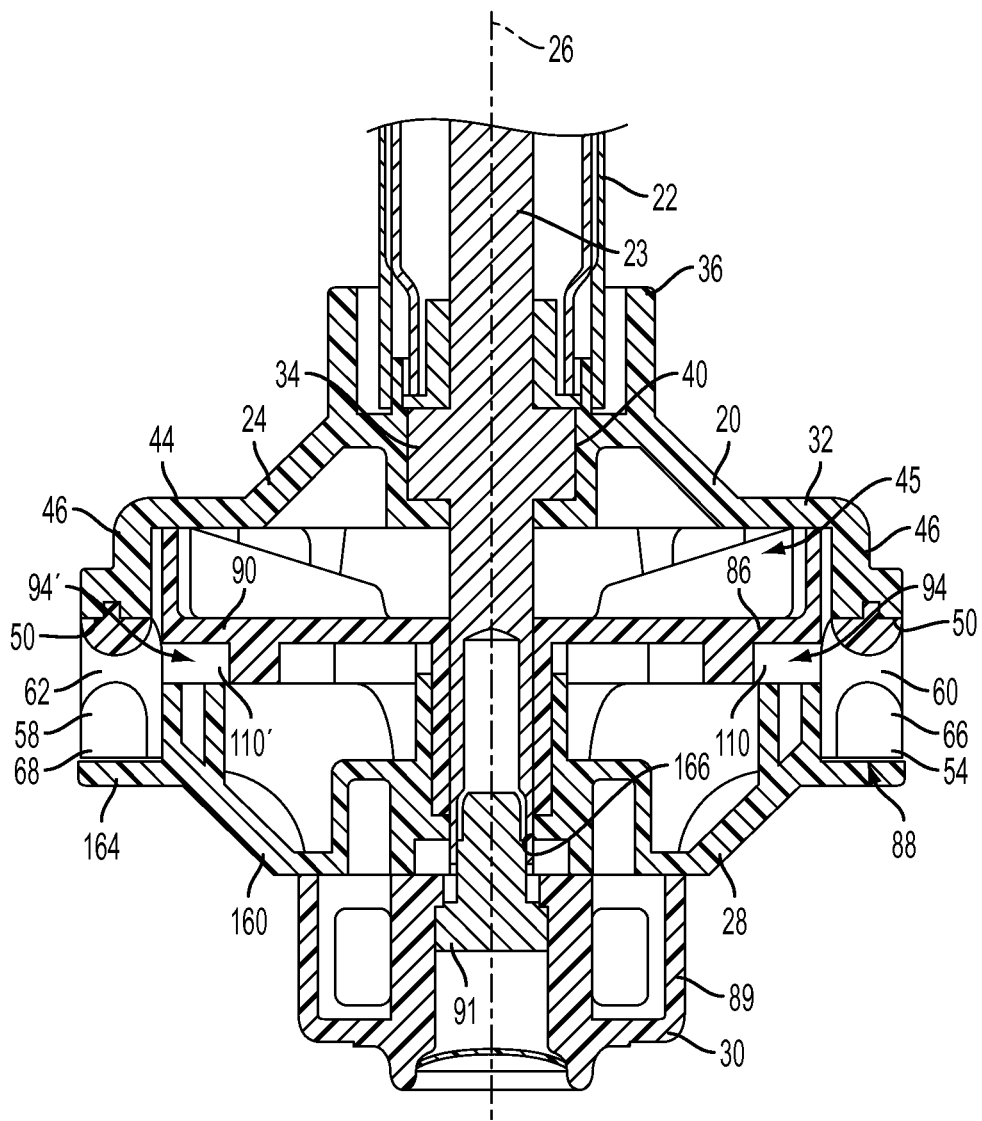
FIG. 7 is a section view of the string head trimmer taken along lines 7—7 of FIG. 6.
Figure 8:
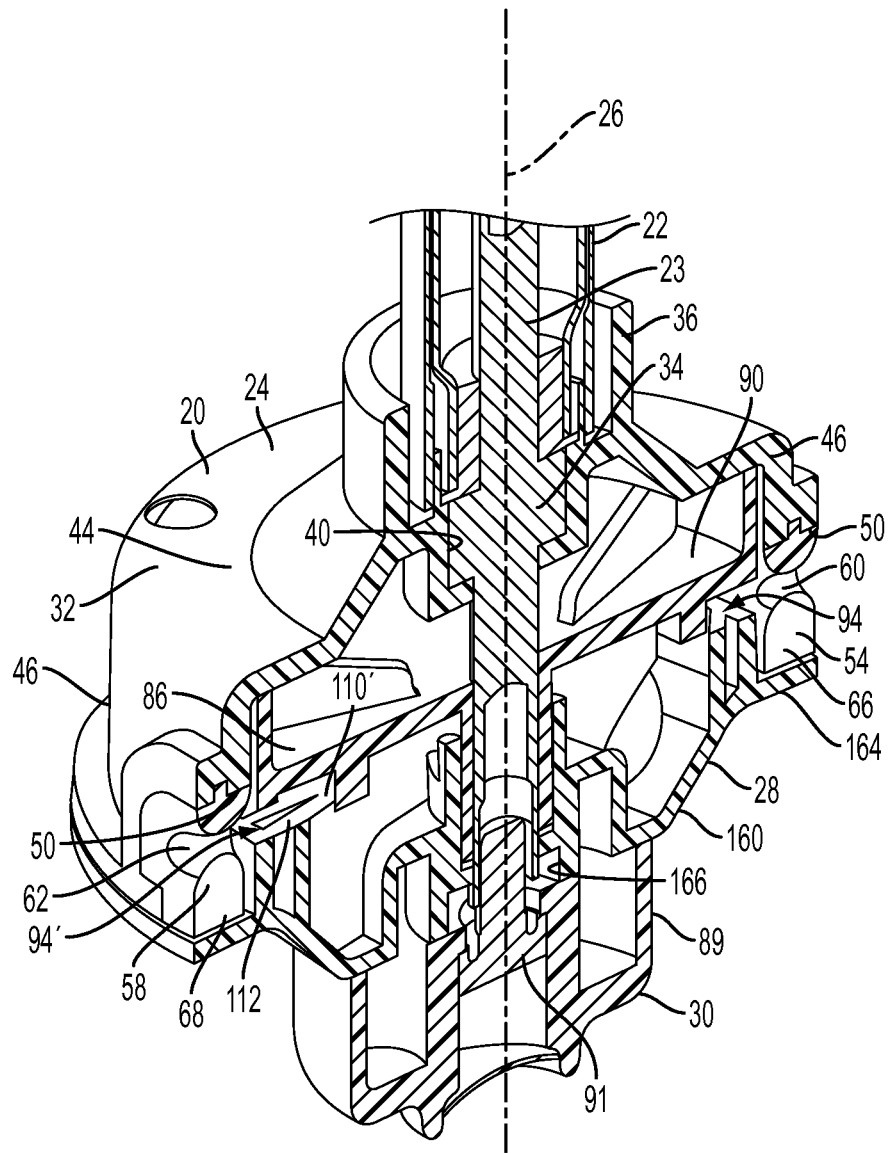
FIG. 8 is a perspective view of the string head trimmer of FIG. 7.
Figure 9:
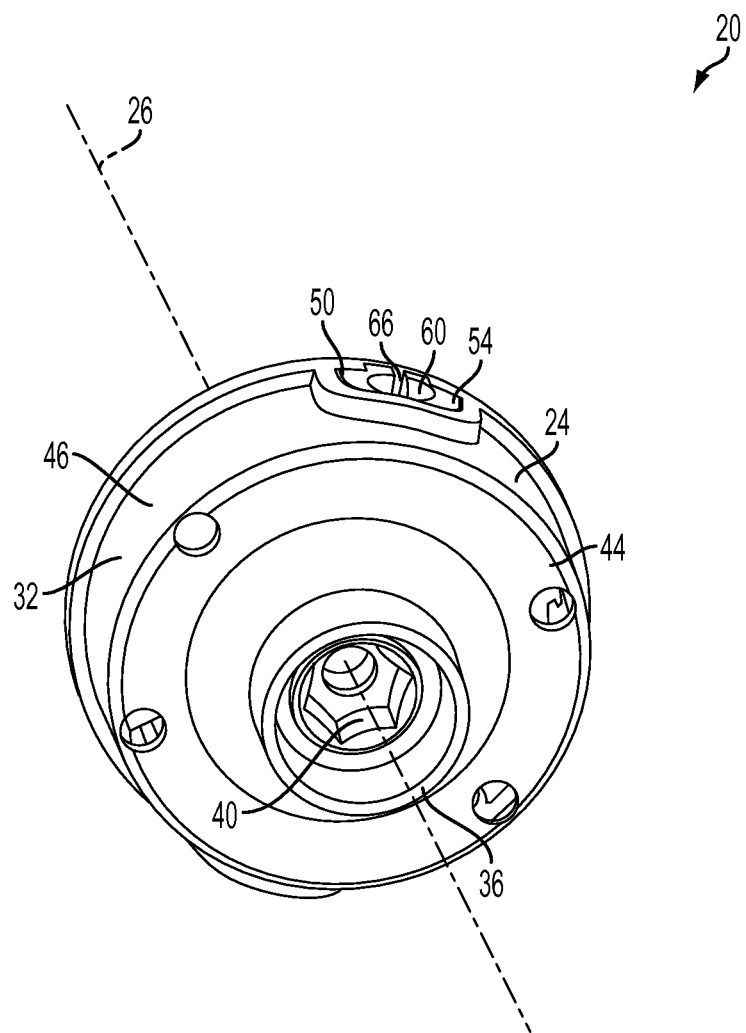
FIG. 9 is a top perspective view of a string head of the string head trimmer of FIG. 6 with the output shaft removed.
Figure 11:
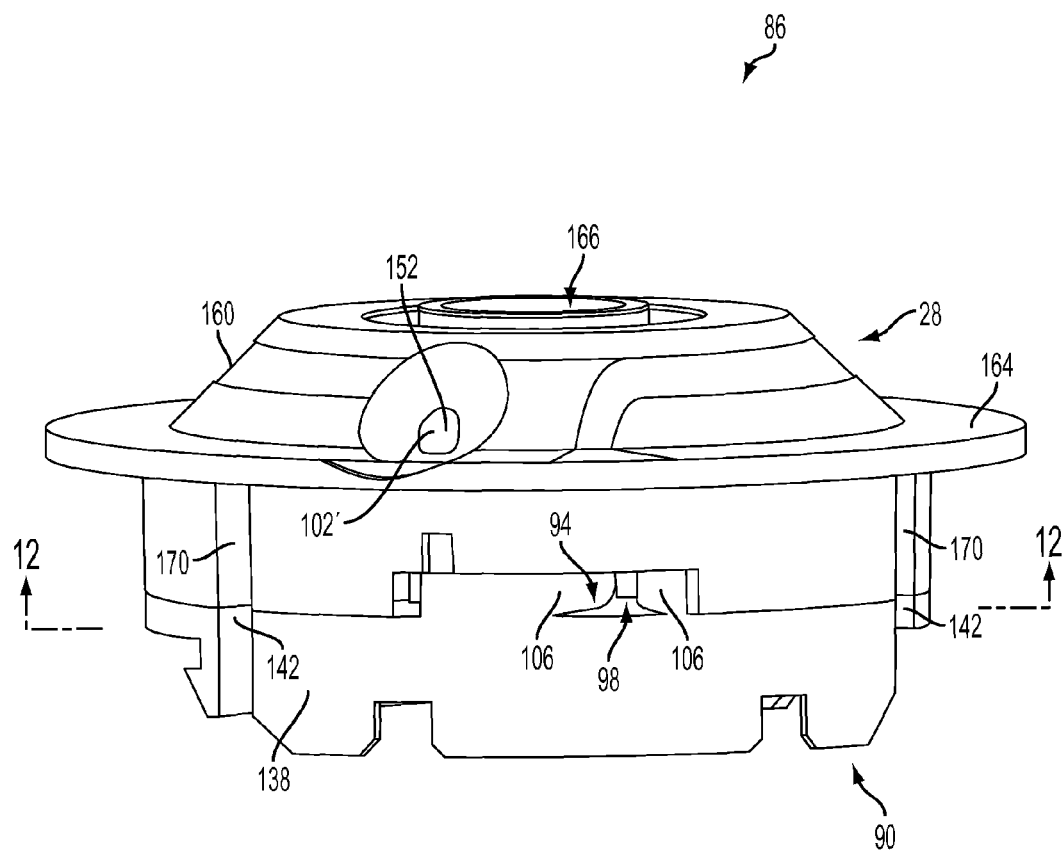
FIG. 11 is side view of a fixed line head.
Figure 15:
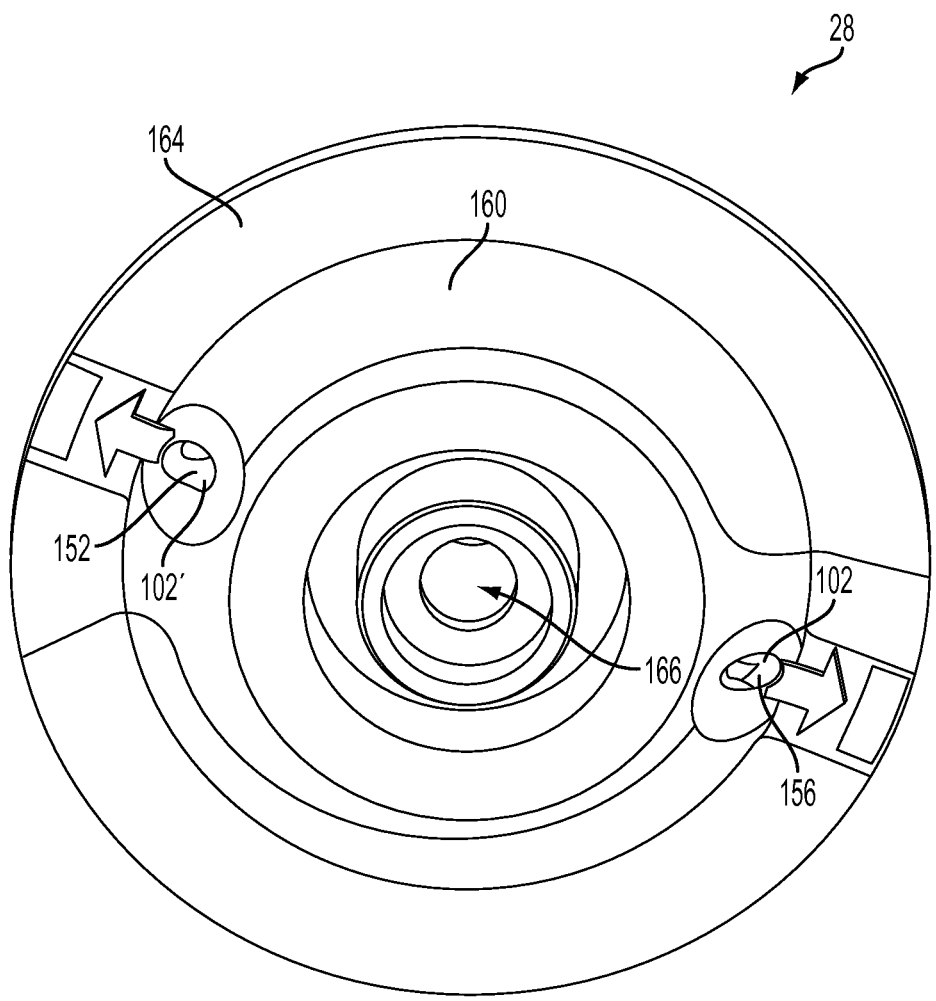
FIG. 15 is top view of the cover of the fixed line head.
Figure 16:
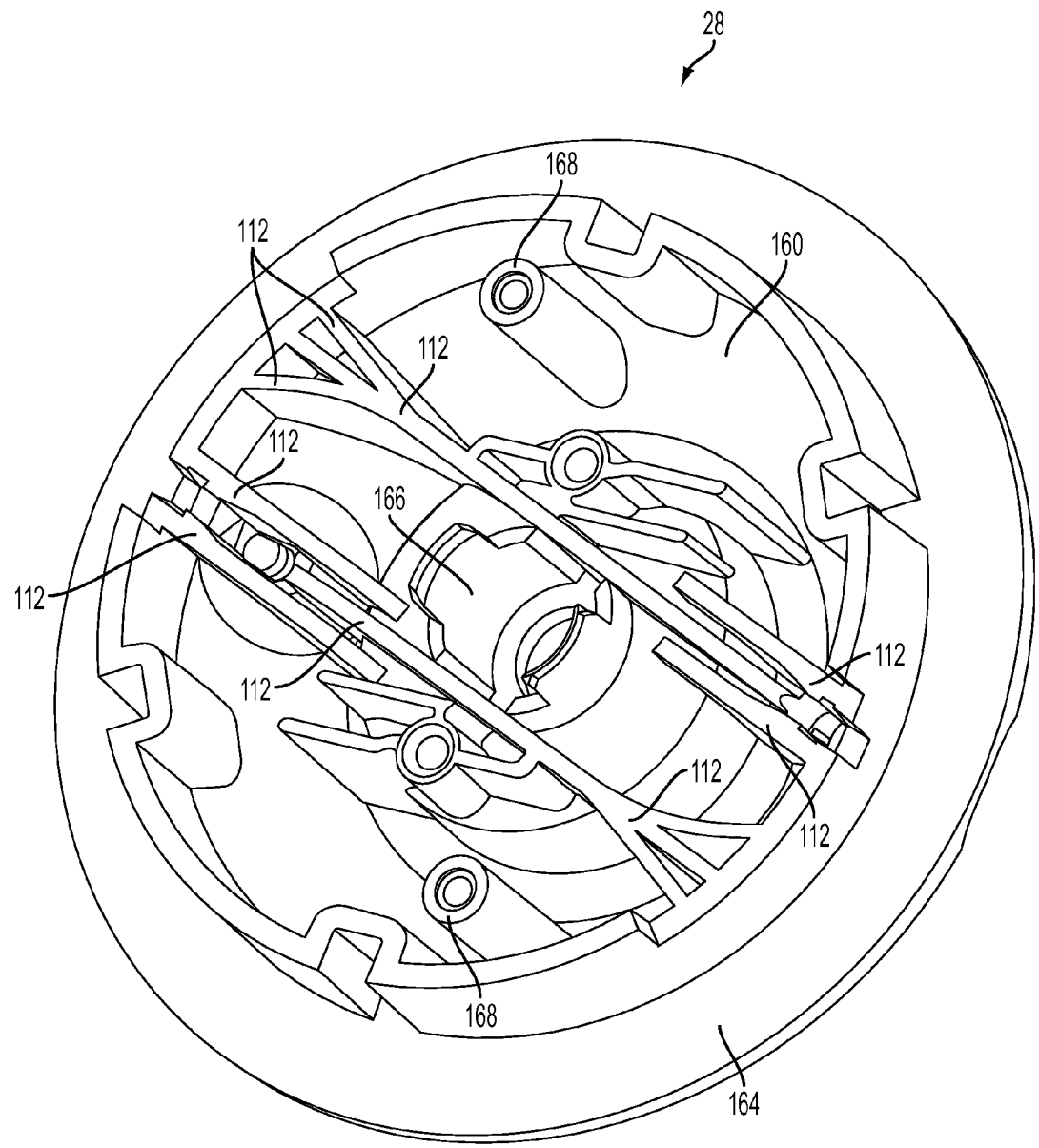
FIG. 16 is a bottom view of the cover of the fixed line head.

Referring to FIGS. 11 and 15-16, the cover 28 of the fixed line head 86 is coupled to the base member 90 and includes a frusto-conical body 160, an outer flange 164 extending radially outwardly from the body 160 to contact the bottom edge 88 of the string head side wall 46, and a central recess 166 for receiving at least a portion of the bump-knob 30 (FIGS. 7 and 8). The cover 28 includes first and second trimmer line outlet apertures 152, 156, which correspond to and align with the outlet end portions 102', 102 of the respective line retainers 94', 94. The cover 28 also includes recesses 170 (FIG. 11) that correspond to and align with the recesses 142 of the base member 90, such that the recesses 170 also receive the stops 69, 70 of the string head base 24 so that the fixed line head 86 rotates with the string head 20 (FIG. 10). Referring to FIG. 16, the cover 28 also includes ribs 112, each of the ribs 112 aligning with one of the walls 106 to further define the channel 110, 110' of the line retainers 94, 94' (FIGS. 12 and 16). In the illustrated construction, the cover 28 includes at least one boss 168 for receiving a fastener to couple the base member 90 and the cover 28. In further constructions, the base member 90 and the cover 28 may be joined by adhesive, form a snap fit, and the like.

To utilize the string head 20 in the fixed line configuration, a user initially removes the bump-feed spool 72 from the base 24 and inserts the fixed line head 86. To remove the spool 72, trimmer lines 76, 78 are removed from the respective apertures 60, 62 and positioned in slots 81, 81'. The bump-knob 30 is removed (e.g., unscrewed) from the output shaft 23 and the spool 72 is axially removed from the cavity 45 (FIG. 5).

To install the fixed line head 86, the head 86, with the base member 90 and the cover 28 coupled together, is axially inserted into the cavity 45 such that the recesses 142, 170 align with the respective stops 70. The bump-knob 30 is re-attached to the output shaft 23 to secure the fixed line head 86 within the cavity 45. Once inserted, the stops 70 and the recesses 142 are arranged to align the inlet end portions 98, 98' of the fixed line head 86 with the respective aperture 60, 62 of the string head 20.

To load a trimmer line into the string head 20 in the fixed line mode, a user inserts a leading end of the trimmer line into the aperture 60 formed by the insert 54. Referring to FIGS. 6-8, as the user inserts the trimmer line through the aperture 60 and thereby the line retainer 94, the walls 106 of the inlet end portion 98 guide the trimmer line into and through the channel 110. As the leading end of the trimmer line contacts the ramped surface 122 of the clamping member 118, the trimmer line forces the clamping member 118 to move in a direction generally opposite of arrow 134, thereby allowing the trimmer line to continue to pass through the channel 110 toward the outlet end portion 102. As the user continues to push the trimmer line through the aperture 60, the leading end of the trimmer line travels up the ramp 114 and out the outlet aperture 152 of the cover 28 (FIG. 15). Referring to FIG. 14, the spring 120 biases the clamping member 118 in the direction of arrow 134, which forces the teeth 124 against the trimmer line to retain the trimmer line between the clamping member 118 and the wall 106 while the trimmer is being used. As such, the clamping member 118 prohibits the trimmer line from being removed from the aperture 60, and only allows the trimmer line to continue to pass in the direction of the arrow 176 and out of aperture 152.

The second trimmer line is inserted into the string head 20 in substantially the same manner as the first trimmer line. A leading end of the second trimmer line is inserted into the aperture 62 formed by the insert 58 and through the outlet aperture 152 of the cover 28, and the second trimmer line is retained in proper position by the clamping member 118' of the line retainer 94', similar to the line retainer 94 discussed above.

During operation, the length of trimmer line extending from the apertures 60, 62 are used to cut vegetation as the string head 20 rotates with the output shaft 23. Once the trimmer line has become worn and/or damaged, the user removes the trimmer line by pulling on the leading edge extending from the respective cover aperture 152, 156 and a new piece of trimmer line may be inserted in its place as described above.

Once the string head 20 has been converted into the fixed line configuration, the string head 20 may be converted back to a bump-feed configuration by removing the fixed line head 86 from the base 24 and replacing it with the spool 72. To remove the fixed line head 86 from the base 24, the bump-knob 30 is removed (e.g., unscrewed) from the output shaft 23 and the fixed line head 86 is axially removed from the cavity 45 (with or without the trimmer lines installed). The spool 72 is then installed as discussed above.

Accordingly, the string head 20 may be utilized as either a fixed line string head or a bump-feed string head and easily changed back and forth by the user. The base 24 and the bump-knob 30 are utilized whether the string head 20 is used in the fixed line configuration or the bump-feed configuration. To switch between the bump-feed and the fixed line configurations, a user simply replaces the bump-feed spool 72 with the fixed line head 86 and inserts discrete pieces of trimmer line as discussed above, or vice versa.

Although particular constructions embodying independent aspects of the present invention have been shown and described, other alternative constructions will become apparent to those skilled in the art and are intended scope of the independent aspects of the invention. Various features and advantages of the invention are set forth in the following claims.

The invention claimed is:

1. A landscape trimmer comprising:
   a motor;
   an output shaft driven by the motor; and
   a trimmer head coupled to the output shaft and rotatable with the output shaft, the trimmer head operable in a fixed line configuration and a bump-feed configuration, the trimmer head comprising,
   a base including a cup having a top wall and a substantially cylindrical side wall that defines an aperture, the base including a collar extending axially from the top wall of the cup and for coupling the trimmer head with the output shaft, and the base further including at least one stop,
   a fixed line head at least partially received within the cup of the base when the trimmer head is in the fixed line configuration, the fixed line head including at least one channel having an inlet portion substantially aligned with the aperture of the base, an outlet portion, and a clamping member, the fixed line head engaging said at least one stop in a rotationally-fixed and driving engagement manner when the trimmer head is in the fixed line configuration, and
   a bump-feed spool at least partially received within the cup of the base when the trimmer head is in the bump-feed configuration, the bump-feed spool including a body and a trimmer line wrapped around the body, the trimmer line extending through the aperture in the side wall of the base when the bump-feed spool is received by the base, the bump-feed spool being in releasable and driving engagement with said at least one stop, said at least one stop allowing the bump-feed spool to rotate a predetermined angular distance with respect to the base upon contacting the trimmer head with an external surface.

2. The trimmer head of claim 1, further comprising a bump-knob, wherein the bump-knob retains the fixed line head within the cup when the trimmer head is in the fixed line configuration and retains the bump-feed spool within the cup when the trimmer head is in the bump-feed configuration.

3. The trimmer head of claim 2, wherein the bump-knob is removably coupled to the output shaft.

4. The trimmer head of claim 1, wherein the fixed line head includes a base member that at least partially defines the channel and a cover removably coupled to the base member.

5. The trimmer head of claim 4, wherein the cover at least partially defines the channel.

6. The trimmer head of claim 4, wherein the cover includes an aperture substantially aligned with the output portion of the channel.

7. The trimmer head of claim 1, wherein the aperture defined by the side wall of the base is generally U-shaped and includes an open end.

8. The trimmer head of claim 1, wherein the at least one stop extends radially inwardly from the side wall.

9. The trimmer head of claim 8, wherein the fixed line head includes at least one recess extending axially therethrough, the at least one recess receiving the at least one stop when the fixed line head is received in the base to align the inlet portion with the aperture defined by the side wall.

10. A method of converting a trimmer head between a fixed line configuration and a bump-feed configuration, the trimmer head including a base having a side wall defining a first aperture and an inner cavity, the base further including at least one stop extending radially inwardly from the side wall, one of a spool and a fixed line head at least partially received within the cavity, and a bump-knob to retain the one of the spool and the fixed line head within the inner cavity, the method comprising:

removing the bump-knob;

removing the one of the spool and the fixed line head from the inner cavity;

positioning the other of the spool and the fixed line head within the inner cavity, when the spool is positioned within the inner cavity, releasably and drivingly engaging the spool with the at least one stop, when the fixed line head is positioned within the inner cavity, engaging the fixed line head in a rotationally-fixed and driving engagement manner with the at least one stop; and coupling the bump-knob to the trimmer head to retain the other of the spool and the fixed line head within the inner cavity.

11. The method of claim 10, further comprising:

when the fixed line head is positioned within the inner cavity, inserting a first end of a trimmer line into the first aperture and the fixed line head such that the trimmer line is retained within the fixed line head by a clamping member.

12. The method of claim 10, wherein the fixed line head includes a channel, the channel having an inlet portion, an outlet portion, and a clamping member, and further wherein positioning the fixed line head into the inner cavity includes aligning the inlet portion with the first aperture.

13. The trimmer head of claim 1, wherein the base includes a plurality of first stops extending radially from the side wall and a plurality of second stops extending axially from the top wall, wherein the fixed line head engages the second stops in a rotationally-fixed and driving engagement manner when the trimmer head is in the fixed line configuration, and wherein the bump-feed spool is in releasable and driving engagement with the second stops, the second stops allowing the bump-feed spool to rotate a predetermined angular distance with respect to the base upon contacting the trimmer head with an external surface, the bump-feed spool engaging the first stops to limit rotation relative to the base.

* * * * *